(12) United States Patent
Bustos et al.

(10) Patent No.: US 8,210,021 B2
(45) Date of Patent: Jul. 3, 2012

(54) AROMAS KIT

(75) Inventors: Veronica L Bustos, Mill Valley, CA (US); Alexandre Schmitt, Mengnac (FR)

(73) Assignee: Christopher Bryan Crass, Greenbrae, CA (US)

( * ) Notice: Subject to any disclaimer, the term of this patent is extended or adjusted under 35 U.S.C. 154(b) by 269 days.

(21) Appl. No.: 12/688,416

(22) Filed: Jan. 15, 2010
(Under 37 CFR 1.47)

(65) Prior Publication Data

US 2011/0003732 A1 Jan. 6, 2011

Related U.S. Application Data

(60) Provisional application No. 61/145,476, filed on Jan. 16, 2009.

(51) Int. Cl.
*G01N 33/00* (2006.01)
*G01N 33/02* (2006.01)
*A23L 1/00* (2006.01)

(52) U.S. Cl. ......... 73/1.02; 73/53.01; 73/23.34; 702/22; 426/534; 99/275; 434/127

(58) Field of Classification Search .................. 73/1.02, 73/23.01, 23.34; 702/22; 426/534; 434/127; 99/275

See application file for complete search history.

(56) References Cited

U.S. PATENT DOCUMENTS

| | | | | |
|---|---|---|---|---|
| 2,548,701 | A | * | 4/1951 | Carveth, Jr. .................. 426/8 |
| 4,198,309 | A | * | 4/1980 | Mookherjee et al. ......... 510/106 |
| 4,357,259 | A | * | 11/1982 | Senyei et al. ................. 264/4.3 |
| 5,200,909 | A | | 4/1993 | Juergens |
| 5,744,183 | A | * | 4/1998 | Ellsworth et al. .......... 426/330.4 |
| 6,506,430 | B1 | | 1/2003 | Zimlich |
| 6,541,260 | B1 | | 4/2003 | Pariseau |
| 7,010,956 | B2 | * | 3/2006 | Head et al. .................. 73/23.34 |
| 7,124,035 | B1 | | 10/2006 | Tomlinson |
| 7,290,438 | B2 | | 11/2007 | Head |
| 2005/0158798 | A1 | * | 7/2005 | Sher .............................. 435/7.1 |
| 2006/0286237 | A1 | * | 12/2006 | Reiss et al. .................... 426/534 |
| 2007/0248730 | A1 | * | 10/2007 | Wood et al. .................... 426/494 |

FOREIGN PATENT DOCUMENTS

KR 642052 B1 * 10/2006

* cited by examiner

*Primary Examiner* — James J Seidleck
*Assistant Examiner* — Saira B Haider
(74) *Attorney, Agent, or Firm* — Steven A. Nielsen; Allman & Nielsen, P.C.

(57) ABSTRACT

An Aromas kit uses containers of certain discrete molecules to provide odors suitable for an olfactory education of wine properties. The disclosed molecules may be found within certain wines and provide a useful olfactory reference when smelling a finished wine sample, even when the wine sample contains a myriad of other conflicting or competing molecule smells.

9 Claims, No Drawings

AROMAS KIT

RELATED PATENT APPLICATION AND INCORPORATION BY REFERENCE

This is a utility application based upon U.S. patent application Ser. No. 61/145,476 "Aromas Kit" filed on Jan. 16, 2009. This related application is incorporated herein by reference and made a part of this application. If any conflict arises between the disclosure of the invention in this utility application and that in the related provisional application, the disclosure in this utility application shall govern. Moreover, the inventor(s) incorporate herein by reference any and all patents, patent applications, and other documents hard copy or electronic, cited or referred to in this application.

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

BACKGROUND OF THE INVENTION (1) Field of the Invention

The invention generally relates to familiarization and training in practice and art of olfactory recognition of wine properties. More particularly, the invention relates to the use of certain chemical compounds within a kit for teaching odor recognition relevant to wine evaluation.

(2) Description of the Related Art

U.S. Pat. No. 5,200,909 by Juergens discloses a method and apparatus for classifying wine by use of chemical analysis and assigning objective scale values. U.S. Pat. No. 7,290,438 by Head et al discloses an apparatus and method for mechanically detecting the presence of chemical contaminates that may be found within wine. U.S. Pat. No. 7,124,035 by Tomlinson discloses an apparatus and method for classifying wine in terms of fruit and non-fruit flavors. The known prior art fails to use specific compounds in teaching the art of olfactory recognition of wine elements or wine properties.

BRIEF SUMMARY OF THE INVENTION

The present invention overcomes shortfalls in the related art by presenting an unobvious and unique combination, configuration and use of chemical compounds that have achieved unexpected results in producing odors useful in calibrating olfactory recognition of wine properties. The known related art fails to disclose, suggest or teach the use of the disclosed chemical compounds as a training aid in teaching olfactory recognition in the art of wine evaluation.

The disclosed combination and use of the described chemical compounds represent a new methodology in wine evaluation and a new paradigm teaching human beings the art of recognizing wine aromas and reporting wine qualities. In the related art, wine aromas may be described as having a smell similar to common food products. For example, in the prior art a wine may be described as having a strawberry aroma or raspberry aroma. These mental impressions are used in the prior art to describe a common smell, such that others may understand what the reporter is describing. A problem in the related art is that there are no known strawberry or raspberry compounds found within wine. The prior art has artificially introduced smells from other products to describe wine fragrances. A shortcoming in the prior art is that there are at least 200 different strawberry aromas but yet no way to assign a particular real strawberry aroma to a particular wine description, such as "this wine has a strawberry aroma."

The present invention overcomes shortfalls in the related art by using certain useful sets of chemical compounds or molecules that are sometimes actually found within wine. The disclosed kit exposes wine students to very close approximations to sets and subsets of actual end use aromas perceived when smelling a finished wine sample. Not all compounds or molecules found within wine products are useful elements in describing wines, and not all possible sets or combinations of compounds are useful in an aroma teaching kit. Creativity and inventiveness is needed to derive the proper sets of compounds as a finished wine sample will offer a complex variety of odors and certain combinations of elemental wine molecules will produce end product smells that have little or no resemblance to the starting elemental modules.

The present invention overcomes other shortfalls in the art by presenting a new classification system for more accurately describing and categorizing wine odors with main aromatic descriptors and aromatic descriptors based upon the sources of the odor. The latter being a mix of aromatic categories of compounds and the sources of their creation.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

The Kit

The present disclosure includes a new kit for presenting compounds, some or all of which are found within certain wines, such that a user of the kit may gain firsthand experience and a firsthand reference to actual wine compounds. A user of the kit may then become familiar with the discrete smells which are found in various combinations within various types of wine. Optionally, the kit includes a compound card or molecule card which is mapped to every container of sample compound. The card may include the molecule name, synonyms, CAS number, chemical formula, weight, volatility, usual concentration in the wine, its threshold of perception in the wine, comments about its synthesis in the wine production, other occurrences in the nature, its olfactory category, aromatic description, and classification. For the aromatic molecules considered to be a produce of a defective condition, the card may proposes remedies and methods of prevention.

The kit may contain seven or more compounds within vials or other containers. Each compound may be diluted within 2.5 ml to 7.5 ml of propylene glycol per ml or gram of compound.

Each compound is presented below as follows:
common name(s)/CAS number; formula; dilution in propylene glycol. The disclosed compounds are also presented within descriptions, classes or notes, such as "acid notes", "volatile notes", "sulfur notes", "barrel aromas" and other as listed within the compound disclosure below.

Acid Notes

1. Vinegar acid/acetic acid/CAS 64-19-7; $CH_3COOH$; 10 ml/L
2. Phenylacetic acid/CAS 103-82-2; $C_8H_8O_2$; 5 ml/L Volatile Notes 3. Ethyl acetate/CAS 141-78-6; $C_4H_8O_2$; 10 ml/L Sulfur Notes/Defects of Reduction 4. Methyl sulfhydrate; thiomethanol CAS 74-93-1; $CH_3SH$; 10 µl/L
5. Ethanethiol/thioethyl alcohol CAS 75-08-1; $CH_3CH_2SH$
6. Hydrogen sulfide/CAS 7783-06-4; $H_2S$;
7. Methionol/3-methylthiopropanol/CAS 505-10-2; $C_4H_{10}OS$; 1 ml/L
8. Benzothiazole/CAS 95-16-9; $C_7H_5NS$; 5 ml/L
9. Dimethyl monosulfide; CAS 75-18-3; $C_2H_6S$; 1 ml/L
10. Dimethyl disulfane/Dimethyl disulphide/CAS 624-92-0; $C_2H_6S_2$; 500 µl/L Other Sulfur Compounds with a Thiol Function 11. 4 MMP/cat ketone/CAS 19872-52-7; $C_6H_{12}OS$; 1 µl/L
12. 3 MH/3-thiohexanol; passion fruit mercaptan; CAS 51755-83-0; $C_6H_{14}OS$; 5 µl/L
13. A3 MH/3-mercaptohexyl acetate/CAS 136954-20-6; $C_8H_{16}O_2S$; 1 ml/L
14. 4MMPOH/CAS 25539165-2; 10 ml/L
15. Benzyl hydrosulfide/CAS100-53-8; $C_7H_8S$; 0,2 µl/L Vegetal/Green Notes 16. C is 3 hexanol/CAS 623-37-0; 10 ml/L
17. Beta-gamma-hexenol/blatteralkohol CAS 928-96-1; $C_6H_{12}O$; 5 ml/L
18. Isobutyl methozyprazine/Z-methoxy-3-isobutylpyrazine/3-isobutyl-2-methoxypyrazine (IBMP)/CAS 24683-00-9; $C_9H_{14}N_2O$; 100 nl/L
19. 2-Methoxy-3-isopropylpyrazine/2-isopropyl-3-methoxypyraline (IPMP)/CAS 25713-40-4; 250 nl/L Earthy/Mushroomy Notes 20. Mushroom alcohol/CAS 3391-86-4; $C_8H_{16}$; 1 ml/L
21. A. 2-methylisoborneol/2-Methyl-isoborneol/CAS 2371-42-8; $C_{11}H_{20}O$; 10 ml/L
22. 2,6-dimethyl bicyclo (6.4.4.06) decan/Geosmine/Geosmin/Octahydromethyl-4-alpha-naphtol/CAS 23333-91-7; $C_{12}H_{22}O$; 10 ml/L Corky Taste 23. 2,4,6-trichloroanisole/1,3,5-trichloro-Z-methoxybenzene/CAS 87-40-1; $C_7H_5CL_3O$; 280 nl/L
24. 1,3,4,6-tetrachloroanisole/CAS 938-22-7; $C_7H_{14}CL_4O$; 280 nl/L
25. Bromoanisol/CAS104-92-7 or 3 Bromoanisole or m-Bromoanlsole_-_CAS 2398-37-0 or 2 Bromoanisole CAS 578.57-4

Pheonols

26. Para-vinyl phenol/Vinyl-4-phenol/4-vinylphenol/CAS 2628-17-3; $C_8H_8O$; 5 ml/L
27. 2-methoxy-4-vinyl phenol/CAS 7786-61-0; $C_9H_{10}O_2$; 200 µl/L
28. Ethyl-4-phenol/4-ethylphenol/CAS123-07-9; $C_8H_{10}O$; 1 ml/L
29. Homo creosol/CAS 2785-89-9; $C_9H_{12}O_2$; 1 ml/L Barrel Aromas 30. Whiskey lactone/Oak lactone/CAS 39212-23-2; $C_9H_{16}O_2$; 10 ml/L
31. 4-allyl catechol-2-methyl ether/Eugenol/CAS 97-53-0; $C_{10}H_{12}O_2$; 1 ml/L
32. Isoeugenol/4-propenyl guaiacol/2-methoxy-4-propenyl phenol/CAS 97-54-1; $C_{10}H_{12}O_2$; 2 ml/L
33. Vanilline/4-hydroxy-3-methoxybenzaldehyde/CAS 121-33-5; $C_8H_8O_3$; 2 ml/L
34. Guaiacol/2-methoxyphenol/CAS 90-05-1; $C_2H_8O_2$; 100 µl/L
35. Coffee mercaptan/2-furan methane thiol/CAS 98-02-2; $C_5H_6OS$; 0, 10 µl/L
36. Furaneol/4-hydroxy-2,5-dimethyl-3-furanone/CAS 3658-77-3; $C_6H_8O_3$; 0,5 ml/L
37. Corps praline/Maltol/CAS118-71-8; $C_6H_6O_3$; 50 ml/L
38. Cycloten/CAS 80-71-7; $C_6H_8O_2$; 1 ml/L
39. Furfural/CAS 98-01-1; $C_5H_4O_2$; 10 ml/L
40. 5-methyl-2-furfural/5-methyl-2-furaldehyde/5-methyl-furfural/Methyl furfuraldehyde/CAS 620-0Z-0; 10 ml/L
41. 5-ethoxymHhylfurfural; 10 ml/L
42. Tran-con-2-enal/trans-Z-nonenal/CAS 18829-56-6; $C_9H_{16}O$; 100 µl/L
43. para-cresol/4-methylphenol/CAS106-44-5; $C_2H_8O$; 100 µl/L Oxidation Notes/Atypical Aging 44. Acetic aldehyde/ethanal/CAS 75-07-0; $C_2H_4O$; 50 ml/L
45. Caramel lactone/sotolon/CAS28664-35-9; $C_6H_8O_3$; 100 µl/L
46. 2-acetyl aniline/ortho acetyl aniline/CAS 551-93-9; $C_8H_9NO$; 1 ml/L Floral Notes 47. β-ionone/CAS14901-07-6; $C_8H_9NO$; 1 ml/L
48. Rose ketone-4/CAS 23696-85-7; $C_{13}H_{18}O$; 10 ml/L
49. Linalol/beta-linaloo l/linalyl alcohol/CAS 78-70-6; $C_{10}H_{18}O$; 10 ml/L
50. Beta-citronellol/CAS106-22-9; $C_{10}H_{20}O$; 10 ml/L
51. Beta-geraniol/trans geraniol/CAS106-24-1; 10 ml/L
52. Nerolol/CAS106-25-2; $C_{10}H_{18}O$; 10 ml/L
53. (R)-para-menth-1-en-8-ol/CAS 10482-56-1; $C_{10}H_{18}O$; 5 ml/L
54. Rose oxide/CAS16409-43-1; $C_{10}H_{18}O$; 10 ml/L
55. Trans-hotrienol/CAS 20053-88-7; $C_{10}H_{16}O$; 10 ml/L 56. Methyl Anthranilate/CAS134-20-3; $C_8N_9NO_2$; 100 µl/L 57. Benzene ethanol/CAS 60-12-8; $C_8H_{10}O$; 50 µl/L Aromas of Malolactic Fermentation 58. Dimethyl glyoxal/CAS 431-03-8; $C_4H_6O_2$; 100 µl/L The Fruity Notes (Alcoholic Fermentation, Technical Wines)

59. Isoamyl ethanoate CAS123-92-2; $C_2H_{14}O_2$; 1 ml/L

60. Caproate d'Allyle/CAS123-68-2; 1 ml/L

61. Capreoate d'ethyle/CAS123-66-0; 1 ml/L 62. d-Limonene/CAS 5989-27-5; 50 ml/L 63. Hexyl acetate/CAS142-92-7; 10 ml/L 64. Hexanoate d'ethyl/CAS136-51-6; 10 ml/L 65. Octanoate d'ethyl/CAS106-32-1; 10 ml/L 66. Decanoate d'ethyl/CAS110-38-3; 10 ml/L 67. Dodecanoate d'ethyl/CAS106-33-2; 10 ml/L Other Notes 68. TDN (1,1,6-trimethyl-1,2-dihydronaphtalene/CAS 7234-04-0

69. Eucalyptol; 10 ml/L

70. Menthol; 10 ml/L

71. Alpha Pinene/CAS 106-33-2; 10 ml/L

72. Muscat Base; 10 ml/L

Compounds Found within Kits

Each kit should have at least one compound from each of the main categories. In one embodiment the kit comprises:

Vinegar acid, Ethyl acetate, Methyl sulfhydrate, 4 MMP, Beta-gamma-hexenol; Mushroom alcohol; 2,4,6-trichloroanisole; Para-vinyl phenol; Whiskey lactone, Acetic aldehyde, Rose ketone, Dimethyl glyoxal and Isoamyl acetate.

In yet another embodiment, the disclosed kit contains one or more of the molecules from each of the following groups, as described above: acid notes, sulfur notes, vegetal/green notes and pheonols. Larger kits may further include one or more molecules from the fruity notes, and/or floral notes, and/or oxidation notes, and/or earthy notes, and/or corky taste, and/or the other disclosed groups.

A very economical kit comprises one or more compounds from the floral notes and fruity notes. Sub-kits are contemplated wherein each sub-kit or kit contains one or more compounds from one category. For example, a sub-kit or kit may contain one or more compounds from the barrel aromas. Such a kit would contain one or more compounds from the set of compounds numbered herein of 30 to 43, inclusive. Another example of a contemplated kit contains one or more compounds from the floral notes. Such a kit would contain one or more compounds from the set listed herein comprising compound numbers 47 to 58, inclusively. Sub-kits are contemplated for many reasons, including the fact that several of the disclosed compounds are exceptionally expensive to procure.

These and other changes in kit contents can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. To with, smaller kits may be used for amateur wine enthusiasts and more complete kits may be assembled for use by commercial wine proprietors.

What is claimed is:

1. A kit comprising:
  Vinegar acid, Ethyl acetate, Methyl sulfhydrate, cat ketone, Beta-gamma-hexenol; Mushroom alcohol; 2,4,6-trichloroanisole; Para-vinyl phenol; Whiskey lactone, Acetic aldehyde, Rose ketone, Dimethyl glyoxal and Isoamyl acetate.

2. The kit of claim 1 further comprising:
  a) phenylacetic acid;
  b) one or more compounds selected from: ethanethiol, hydrogen sulfide, methionol, benzothiazole; dimethyl monosulfide, and dimethyl disulfane;
  c) one or more compounds selected from:
  cis 3 hexanol, isobutyl methozyprazine and 2-Methoxy-3-isopropylpyrazine; and
  d) one or more compounds selected from:
  2-methoxy-4-vinyl phenol , ethyl-4-phenol and homo creosol.

3. The kit of claim 1 further comprising one or more compounds selected from:
  2-methylisoborneol and 2, 6-dimethyl bicyco.

4. The kit of claim 1 further comprising one or more compounds selected from:
  1,3,4,6-tetrachloroanisole, and bromoanisol.

5. The kit of claim 1 further comprising one or more compounds selected from:
  caproate d'Allyle ,capreoate d'ethyle , d-Limonene, hexyl acetate, hexanoate d'ethyl, octanoate d'ethyl, decanoate d'ethyl and dodecanoate d'ethyl.

6. The kit of claim 1 further comprising one or more compounds selected from:
  caramel lactone and 2-acetyl aniline.

7. The kit of claim 1 further comprising one or more compounds selected from:
  β-ionone, linalol, beta-citronellol, beta-geraniol, nerolol, (R)-para-menth-1-en-8-ol, rose oxide, trans-hotrienol, methyl anthranilate and benzene ethanol.

8. The kit of claim 1 further comprising:
  a) one or more compounds selected from:
  caproate d'Allyle ,capreoate d'ethyle , d-Limonene, hexyl acetate, hexanoate d'ethyl, octanoate d'ethyl, decanoate d'ethyl and dodecanoate d'ethyl; and
  b) one or more compounds selected from:
  β-ionone, linalol, beta-citronellol, beta-geraniol, nerolol, (R)-para-menth-1-en-8-ol, rose oxide, trans-hotrienol, methyl anthranilate and benzene ethanol.

9. The kit of claim 1 further comprising one or more compounds selected from:
  caramel lactone and 2-acetyl aniline.

* * * * *